United States Patent
Vadnere et al.

(10) Patent No.: US 12,402,549 B2
(45) Date of Patent: Sep. 2, 2025

(54) HEADER HEIGHT CORRECTION SYSTEM AND METHOD

(71) Applicant: DEERE & COMPANY, Moline, IL (US)

(72) Inventors: Mohan A. Vadnere, Pune (IN); Geetika K. Purohit, Pune (IN); Mitchell R. Usasz, Ottumwa, IA (US); Nicholas J. Depenbusch, Ottumwa, IA (US)

(73) Assignee: Deere & Company, Moline, IL (US)

( * ) Notice: Subject to any disclaimer, the term of this patent is extended or adjusted under 35 U.S.C. 154(b) by 588 days.

(21) Appl. No.: 17/888,984

(22) Filed: Aug. 16, 2022

(65) Prior Publication Data

US 2024/0057522 A1 Feb. 22, 2024

(51) Int. Cl.
*A01B 63/10* (2006.01)
*A01D 41/14* (2006.01)
(Continued)

(52) U.S. Cl.
CPC ............ *A01B 63/10* (2013.01); *A01D 41/141* (2013.01); *F15B 1/021* (2013.01); *F15B 13/0401* (2013.01); *A01B 63/008* (2013.01); *A01B 73/044* (2013.01); *F15B 11/08* (2013.01); *F15B 11/16* (2013.01); *F15B 13/044* (2013.01); *F15B 2211/212* (2013.01); *F15B 2211/426* (2013.01);
(Continued)

(58) Field of Classification Search
CPC .... A01B 63/10; A01B 63/008; A01D 41/141; A01D 41/145; F15B 1/021; F15B 11/08; F15B 11/16; F15B 13/0401; F15B 13/044; F15B 2211/212; F15B 2211/426; F15B 2211/526; F15B 2211/7052
See application file for complete search history.

(56) References Cited

U.S. PATENT DOCUMENTS 6,928,353 B2 * 8/2005 Finley .................... A01B 59/00
                                                              717/172
7,707,811 B1 * 5/2010 Strosser ............... A01D 41/141
                                                              56/10.2 E (Continued)

FOREIGN PATENT DOCUMENTS

| AU | 2017202258 A1 | * | 1/2018 | ........... A01B 63/002 |
| AU | 2020201227 A1 | * | 3/2020 | ........... A01D 41/141 |
| EP | 3210447 A1 | * | 8/2017 | ........... A01B 63/002 |

*Primary Examiner* — Arpad Fabian-Kovacs
(74) *Attorney, Agent, or Firm* — Taft Stettinius & Hollister LLP; Stephen F. Rost (57) ABSTRACT

An agricultural machine includes a main frame, a rockshaft pivotably coupled to the main frame, a lift actuator couple between the rock shaft and the main frame, a lift arm pivotably coupled to the main frame below the rockshaft, a lift strap coupled between the rockshaft and the lift arm, and a lift actuator coupled between the main frame and the lift strap to pull the lift arm upwards. The agricultural machine includes header, which is supported by the lift arm and the float actuator above the ground at a desired harvesting height. During harvesting, the lift arm may encounter uneven ground, causing the header to move away from the desired harvesting height. By measuring float actuator pressure or header position and by changing the pressure in the float actuator or lift actuator in response, the header can be rapidly returned to the desired harvesting height.

20 Claims, 9 Drawing Sheets

(51) Int. Cl.
  *F15B 1/02*       (2006.01)
  *F15B 13/04*      (2006.01)
  *A01B 63/00*      (2006.01)
  *A01B 73/04*      (2006.01)
  *F15B 11/08*      (2006.01)
  *F15B 11/16*      (2006.01)
  *F15B 13/044*     (2006.01)

(52) U.S. Cl.
  CPC . *F15B 2211/526* (2013.01); *F15B 2211/7052* (2013.01)

(56) References Cited

U.S. PATENT DOCUMENTS

| | | | |
|---|---|---|---|
| 9,043,955 B2* | 6/2015 | Nafziger | A01D 41/141 |
| 9,148,998 B2* | 10/2015 | Bollin | A01D 41/127 |
| 10,701,862 B2* | 7/2020 | Thomson | A01D 34/006 |
| 10,820,511 B2* | 11/2020 | Brimeyer | A01B 63/10 |
| 11,297,765 B2* | 4/2022 | Yanke | A01D 41/141 |
| 2017/0359955 A1* | 12/2017 | Dunn | F15B 11/08 |
| 2018/0153101 A1* | 6/2018 | Dunn | A01D 41/141 |
| 2018/0153102 A1* | 6/2018 | Dunn | F15B 1/033 |
| 2022/0061218 A1* | 3/2022 | Karst | A01B 63/10 |
| 2024/0138302 A1* | 5/2024 | Gahres | A01D 43/10 |

* cited by examiner

HEADER HEIGHT CORRECTION SYSTEM AND METHOD

FIELD OF THE DISCLOSURE

The present disclosure relates to controlling the height of a header for an agricultural machine and, in particular, to rapidly adjusting the height of the header.

BACKGROUND OF THE DISCLOSURE

Commercial mowers have varying types of cutting, collecting, and conditioning components. Some mowing machines may only provide a cutting function and are without any crop processing or collecting capability while other machines serve all three functions. Some agricultural machines include a frame, which may be referred to a traction assembly, which is capable of supporting and moving different headers for different cutting, collecting, and conditioning operations.

In use, a header may be located at various heights throughout the machine's operation. For example, the header may raise in response to contacting a bump in the field; it may lower in response to entering a ditch in the field; or it may alternate between repeated up and down movement in response to uneven terrain. Moreover, the machine may move from the field to the road (or visa-versa) or may make a headland turn at the end of the field before proceeding back in the opposite direction. In conventional machines, the header may be located at an undesirable height during certain instances described above. In other instances, the headers of conventional machines may be moved to a desired position too slowly such that harvested crop yield is reduced.

Therefore, what is needed is a system and method for rapidly adjusting the height of a header in response to sensed or stored criteria associated with the terrain or the agricultural machine.

SUMMARY

In an illustrative embodiment, an agricultural machine for rapidly moving a header to a harvesting position comprises: a main frame supported above the ground by ground engaging mechanisms; a lift arm pivotably coupled to the main frame; the header which is configured to harvest crop, wherein the header is coupled to and supported above the ground by the lift arm; a lift actuator configured to extend and contract to pivot the lift arm and the header relative to the main frame; a float actuator pivotably coupled to the lift arm and the main frame to support the header above the ground; at least one valve fluidly coupled to the float actuator and configured to move between open and closed positions to change pressure in the float actuator; a controller configured to send electrical signals to the at least one valve to execute a rapid height correction algorithm, in which the controller adjusts at least one of the float actuator and the lift actuator causing a change in height of the header relative to the ground, in response to receiving correction data associated with at least one of a current height of the header and a current pressure of the float actuator.

In some embodiments, the agricultural machine further comprises a position sensor operatively coupled to the controller and configured to measure a current height of the header relative to the main frame or relative to the ground; wherein the controller is configured to receive correction data from the position sensor associated with the current height of the header; wherein the controller is configured to compare the current height of the header to the harvesting position of the header, which is a predetermined desired height for the header during a harvesting operation; and wherein the controller is configured to execute the rapid height correction algorithm in response to determining that the current height of the header is beyond a threshold difference from the harvesting position of the header.

In some embodiments, in response to determining that the current height of the header is above the harvesting position of the header, the controller sends electrical signals to the least one valve causing the float actuator to extend.

In some embodiments, agricultural machine further comprises a pressure sensor operatively coupled to the controller and configured to determine the current pressure of the float actuator; wherein the controller is configured to receive correction data from the pressure sensor indicative of the current pressure of the float actuator; and wherein the controller is configured to execute the rapid height correction algorithm in response to receiving the correction data from the pressure sensor.

In some embodiments, if the correction data received from the pressure sensor is associated with a current height of the header above the harvesting position, then to execute the rapid height correction algorithm the controller sends electrical signals to the least one valve causing the float actuator to extend.

In some embodiments, to cause the float actuator to extend, the controller is configured to send a first electrical signal to a first valve causing the first valve to move toward the open position and a second electrical signal to a second valve causing the second valve to move toward the open position.

In some embodiments, the correction data includes a signal from the pressure sensor indicative of a decrease in current pressure in the float actuator; and in response to the signal from the pressure sensor indicative of a decrease in current pressure in the float actuator, the controller is configured to send electrical signals to the least one valve causing a further decrease in the current pressure of the float actuator. In some embodiments, the correction data includes a signal from the pressure sensor indicative of an increase in the current pressure of the float actuator; and in response to the signal from the pressure sensor indicative of an increase in the current pressure of the float actuator, the controller is configured to send electrical signals to the least one valve causing a further increase in the current pressure of the float actuator.

In some embodiments, the controller is configured to analyze terrain data including ground contours to determine whether to send electrical signals to the least one valve causing a further increase in the current pressure of the float actuator. In some embodiments, if the correction data received from the pressure sensor is associated with a current height of the header relative below the harvesting position, then to execute the rapid height correction algorithm the controller sends electrical signals to the at least one valve causing the lift actuator to contract.

In some embodiments, if the correction data received from the pressure sensor is associated with a current height of the header below the harvesting position, then to execute the rapid height correction algorithm the controller sends electrical signals to the at least one valve causing the float actuator to contract.

In some embodiments, subsequent to execution of the rapid height correction algorithm, the controller is configured to compare a predetermined pressure of the float actuator to the current pressure of the float actuator; and the controller is configured to send additional signals to the at least one valve to adjust the current pressure of the float actuator to match the predetermine pressure of the float actuator.

In some embodiments, the correction data comprises global positioning data associated with the agricultural machine performing a 180 degree turn and moving between a field and a road. In some embodiments, the correction data comprises a predetermined operating sequence of the agricultural machine associated with at least one of the agricultural machine performing a 180 degree turn and the agricultural machine moving between a field and a road.

In another illustrative embodiment, an agricultural machine for rapidly moving a header to a harvesting position comprises: a main frame supported above the ground by ground engaging mechanisms; a rockshaft pivotably coupled to the main frame for rotation about a first axis; a lift actuator coupled at a first end to the main frame and at a second end to the rockshaft to facilitate pivoting motion of the rockshaft relative to the main frame; a lift arm pivotably coupled to the main frame for rotation about a second axis parallel to the first axis; a header configured to harvest crop, the header being coupled to and supported above the ground by the lift arm; a float actuator pivotably coupled to the lift arm for rotation about a third axis, the third axis being parallel to the first axis, wherein the float actuator provides an upward force to the lift arm, thereby cooperating with the lift arm to support the header above the ground; at least one valve fluidly coupled to the float actuator and configured to move between open and closed positions to change the pressure in the float actuator; and a controller configured to send electrical signals to the at least one valve to execute a rapid height correction algorithm, which extends or contracts the float actuator causing a change in height of the header relative to the ground, in response to receiving correction data associated with at least one of a current height of the header and a current pressure of the float actuator; wherein contraction of the float actuator is configured to occur independent of pivoting motion of the rockshaft relative to the main frame.

In another illustrative, a method of operating an agricultural machine to rapidly return a header of the agricultural machine to a harvesting position comprises: receiving, from a sensor of the agricultural machine, correction data associated with a current position of the header; comparing the correction data with the harvesting position of the header, which is a predetermined value associated with a desired height of the header during a harvesting operation; and adjusting a float actuator, which supports the header above the ground, to move the header to the harvesting position, in response to the comparison between the correction data and the harvesting position, wherein the float actuator is coupled between a lift arm that assists in supporting the header above the ground and a main frame of the agricultural machine to which the lift arm is pivotably coupled.

In some embodiments, the method further comprises, prior to the receiving step, measuring a current pressure of the float actuator via the sensor to obtain the correction data. In some embodiments, the method further comprises, prior to the receiving step, measuring the height of the header relative to the ground via the sensor to obtain the correction data. In some embodiments, the method further comprises, prior to the receiving step, measuring the height of the header relative to the main frame of the agricultural machine via the sensor to obtain the correction data.

In some embodiments, the adjusting step includes: sending electrical signals to a first valve and a second valve, which are fluidly coupled to the float actuator to cause movement of the first valve and the second valve between open and closed positions.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
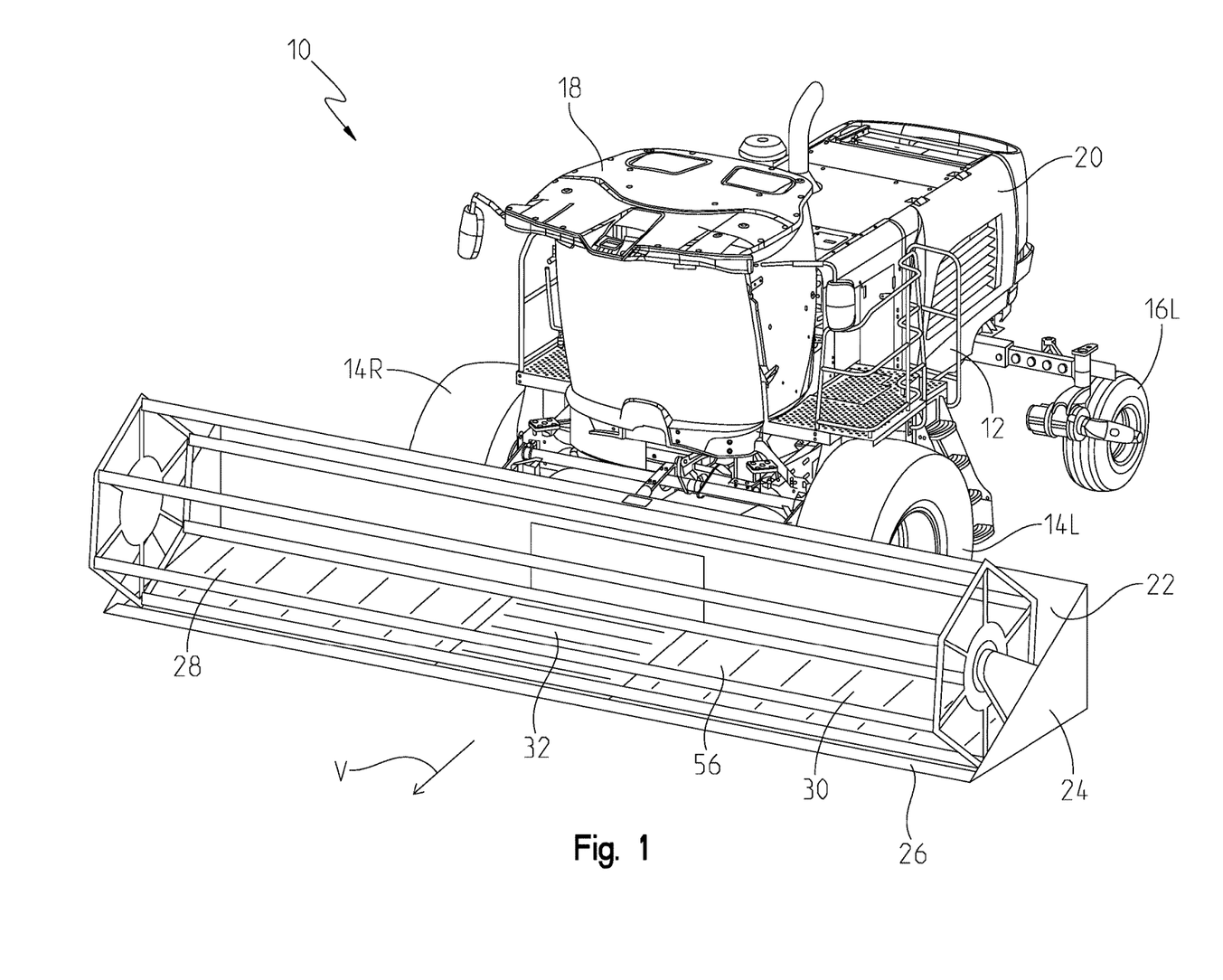
FIG. 1 is a side front perspective view of an agricultural machine including a mower implement positioned at a front end of the agricultural machine.

Referring to FIG. 1, an agricultural machine 10 is shown and is operable to harvest crop in a field. The agricultural machine 10 includes a main frame 12 supported on right and left front wheels 14R and 14L, respectively, and on right and left caster mounted rear wheels, of which only a left rear wheel 16L is shown. In some embodiments, other wheel configurations (and/or tracks) may be included in the agricultural machine 10. The agricultural machine 10 also includes a cab 18 carried on a forward portion of the main frame 12. Operator controls (e.g. a user interface) are provided in the cab 18 for operation of the agricultural machine 10. In the illustrative embodiment, the agricultural machine 10 includes a housing 20 positioned reward of the cab 18 and a power source such as an internal combustion engine positioned in the housing 20. The agricultural machine 10 also includes a traction assembly 36 coupled to the forward portion of the main frame 12. As shown in FIG. 1, the agricultural machine 10 includes a header 22, which may be referred to as a draper or mower implement, coupled to and supported above the ground by the traction assembly 36.

The header 22 includes a laterally extending frame 24 that extends perpendicular to a fore-and-aft harvesting direction of travel "V" of the agricultural machine 10. The header 22 further includes an elongate reciprocating knife 26 that extends across a width of the header 22. This reciprocating knife 26 is disposed immediately in front of a harvested crop conveyor assembly. In the illustrative embodiment, the harvested crop conveyor assembly includes a right side conveyor 28 that carries harvested crop from the right side of the header 22 to a central region of the header 22, a left side conveyor 30 that carries crop from the left side of the header 22 to the central region of the header 22, and a central conveyor 32 that receives crop from the left side conveyor 30 and the right side conveyor 28, and conveys the harvested crop rearward.

Figure 2:
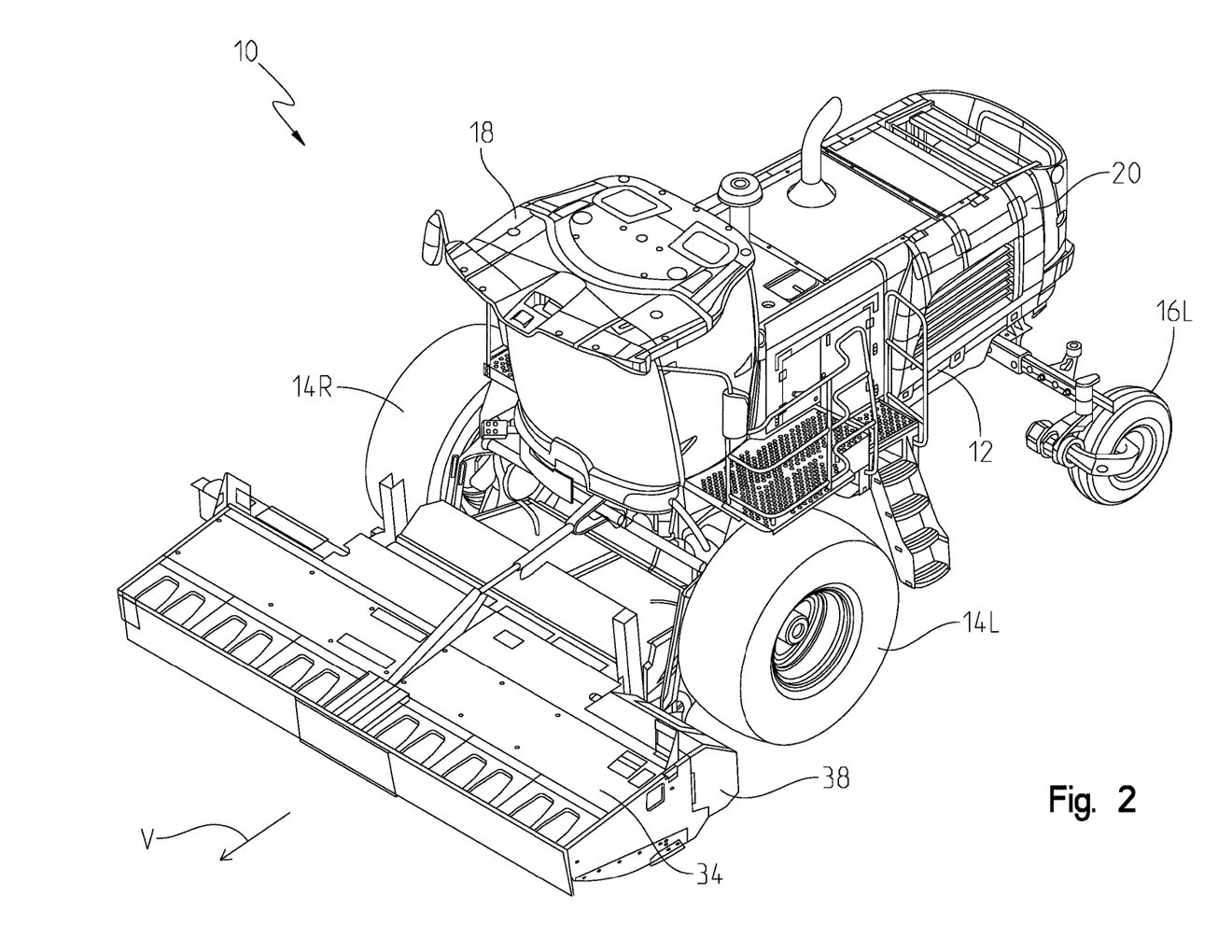
FIG. 2 is a side front perspective view of the agricultural machine including a mower-conditioner implement positioned at a front end of the agricultural machine.

In this disclosure, the implement (i.e. header) of the agricultural machine 10 could take many configurations in addition to that described with regard to FIG. 1. For example, as shown in FIG. 2, the implement of the agricultural machine 10 may be embodied as a mower-conditioner implement, also referred to as a header 34. The header 34 may include an impeller (e.g., an elongated roll) with a plurality of tines used to scrape harvested crop from cutting blades to shorten drying time of the crop. In other embodiments, the header 34 may include a roll conditioner (e.g., a pair of cylindrical rolls) used to crimp crop stems to shorten drying time and mitigate exposure to environmental elements. In any event, as shown in FIG. 2, the header 34 includes a laterally extending frame 38 that extends perpendicular to the fore-and-aft harvesting direction of travel "V" of the agricultural machine 10.

Figure 3:
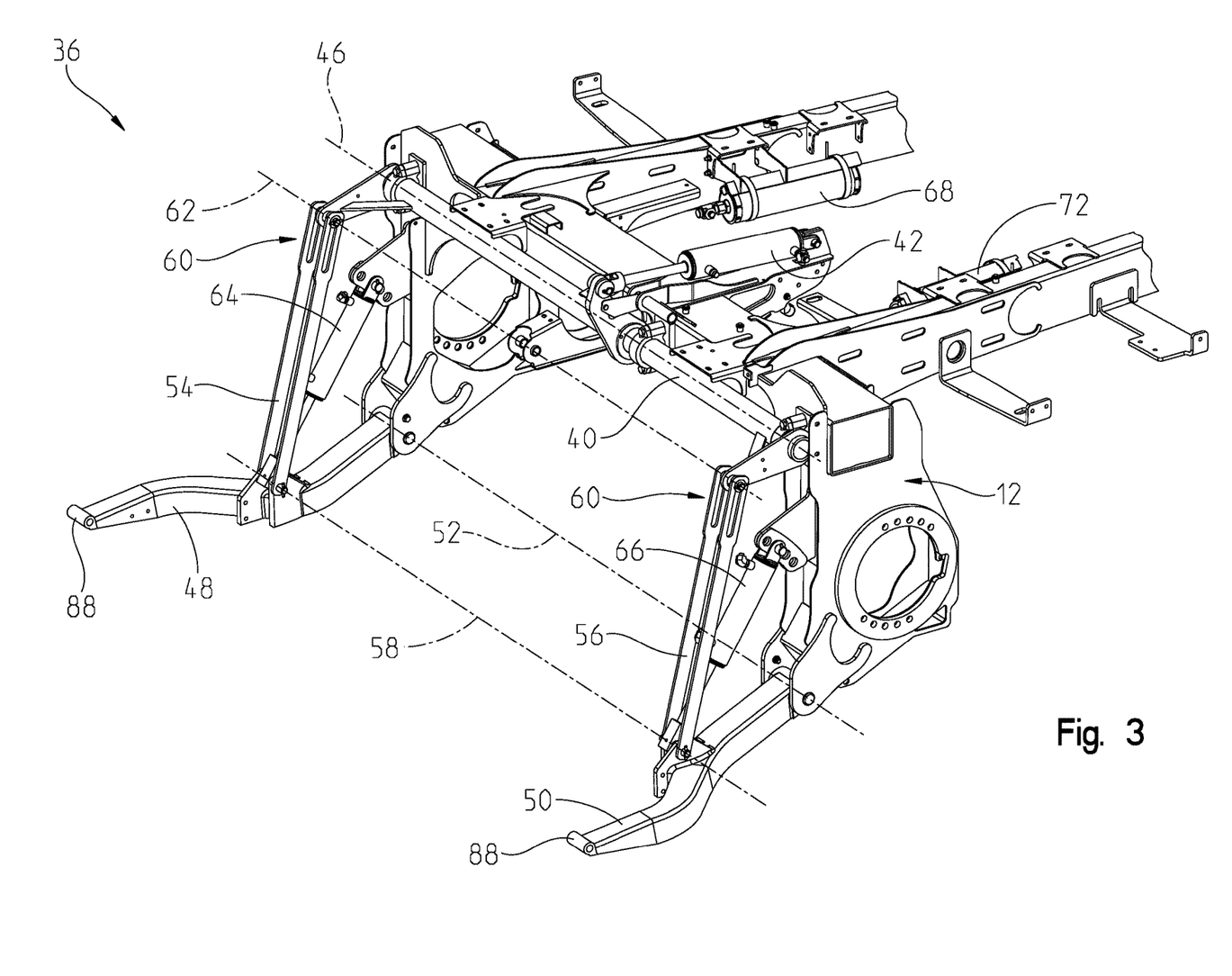
FIG. 3 is a side front perspective view of a traction assembly of the agricultural machine of FIGS. 1 and 2.

FIG. 3 is a perspective view of the traction assembly 36. The traction assembly 36 includes a rockshaft 40 coupled to the forward portion of the main frame 12. The rockshaft 40 illustratively includes a cylindrical bar and a plurality of plates coupled to the cylindrical bar for pivoting motion therewith. The traction assembly 36 further includes a header lift actuator 42, which is coupled to the rockshaft 40 to cause pivoting motion thereof relative to the main frame 12. For example, when the lift actuator 42 contracts, the rockshaft 40 pivots upward relative to the main frame 12, and when the lift actuator 42 extends, the rockshaft 40 pivots downward relative to the main frame 12. As suggested by FIG. 3, the rockshaft 40 pivots about an axis 46, which extends through the cylindrical bar, relative to the main frame 12. In the illustrative embodiment, the lift actuator 42 is a hydraulic actuator; however, this disclosure contemplates electric and other actuators as well.

Referring still to FIG. 3, the traction assembly 36 further includes a first lift arm 48 and a second lift arm 50 each positioned below and spaced apart form the rockshaft 40. In the illustrative embodiment, the lift arms 48, 50 are identical to each other. The lift arms 48, 50 are pivotably coupled to the main frame 12 and configured to pivot about an axis 52 relative to the main frame 12. In the illustrative embodiment, the axis 52 is parallel to the axis 46. A header (e.g., header 22 or 34) may be coupled and supported by the lift arms 48, 50 to facilitate a mowing operation. The traction assembly 36 further includes a first lift strap 54 and a second lift strap 56, each being pivotably coupled at a first end to a plate of the rockshaft 40 and pivotably coupled at a second end to lift arms 48, 50, respectively. In the illustrative embodiment, the lift straps 54, 56 are identical to each other. The first end of each lift strap 54, 56 includes at least one slot 60 that facilitates vertical sliding movement of the lift straps 54, 56 relative to the rock shaft 40, which in turn facilitates additional pivoting movement of the lift arms 48, 50 relative to the main frame 12. The vertical sliding movement of the lift straps 54, 56 facilitates movement of the lift arms 48, 50 and header 22 without movement of the rockshaft 40. While the header 22 is referred to above, it should appreciated the disclosure above and otherwise herein is applicable to headers 22, 34 and other headers suitable for harvesting operations described herein.

The traction assembly 36 further includes first and second float actuators 64, 66, which are pivotably coupled at first ends to the main frame 12 and at second ends to middle portions of the first and a second lift straps 54, 56, respectively. In the illustrative embodiment, the middle portion of each lift strap 54, 56 is positioned between the first and second end thereof. The float actuators 64, 66 contract with upward movement of the lift arms 48, 50 and extend with downward movement of the lift arms 48, 50.

Figure 4:
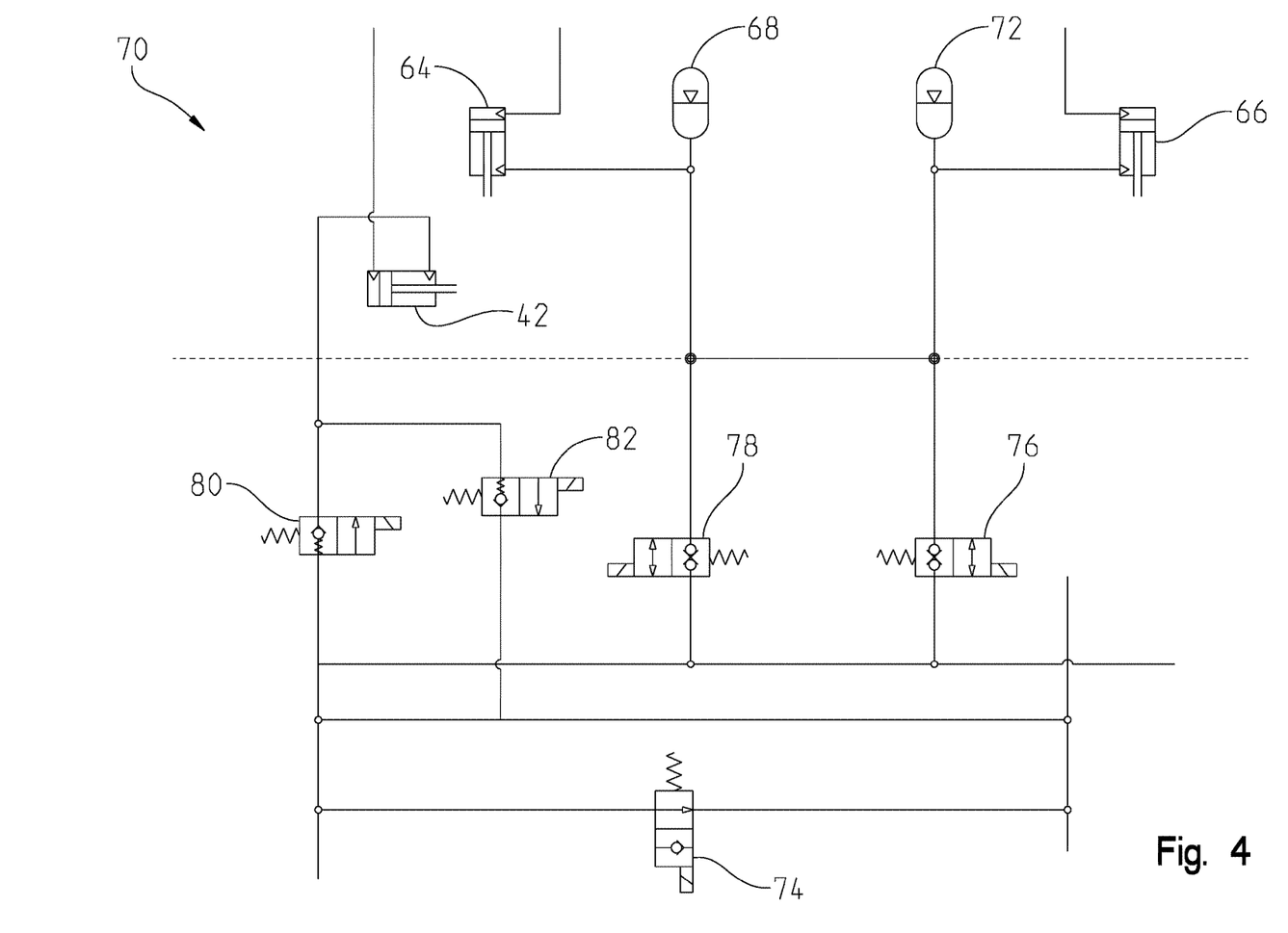
FIG. 4 is a schematic or diagrammatic view of a hydraulic system for operating the traction assembly of FIG. 3.

As shown in FIG. 4, the agricultural machine 10 includes a hydraulic system 70, which includes the float actuators 64, 66. As suggested by FIG. 3, the weight of the header 22 on the lift arms 48, 50 provides a downward force, urging the lift arms 48, 50 to pivot downward relative to the main frame 12 about the axis 52. The float actuators 64, 66 are pressurized to counteract the downward force on the lift arms 48, 50. As the agricultural machine 10 travels, the lift arms 48, 50 may encounter uneven terrain (e.g., a bump) causing the lift arms 48, 50 to rapidly pivot (e.g., upward) relative to the main frame 12, which may include rapidly sliding of the lift straps 54, 56 relative to the rock shaft 40 (e.g., upward), which in turn causes a change in the arrangement of the float actuators 64, 66 (e.g., contraction). Contraction or extension of the float actuators 64, 66 causes a change in the amount of pressurized fluid in accumulators 68, 72 of the hydraulic system 70.

Subsequent to the machine's initial response to encountering the uneven terrain, the pressure in the hydraulic system 70 equalizes such that the lift arms 48, 50 slowly return to the height at which the lift arms 48, 50 were positioned prior to the encountering the uneven terrain, which is a predetermined height or a height set by the operator, referred to as the harvesting position. It is desired to rapidly return the header 22 to the harvesting position. As used herein, the slowly and rapidly are terms used relative to each other to describe the improved rate of return to the harvesting position (leading to improved harvesting yield), which is associated with the system and methods disclosed herein versus that of conventional agricultural machines. For example, in convention machines, after contacting a bump, approximately five seconds may pass before a header returns to the harvesting position, which in some embodiments equates to approximately 10-15 square meters of unharvested crop.

It has been identified that other events such as a header dropping into a ditch, a header bouncing up and down, an agricultural machine passing from road to field or visaversa, and an agricultural machine taking a headland turn may each cause a header to move between a harvesting position and another position at a rate that is slower than desired. The processes described herein may be used to manipulate the hydraulic system 70, such that the hydraulic system 70 moves the lift arms 48, 50 (and thereby the header 22) to the harvesting position more rapidly.

As shown in FIG. 4, the hydraulic system 70 includes the float actuators 64, 66 and the float accumulators 68, 72. It should be appreciated that the float actuators 64, 66 may be pressurized independently from one another based on the hydraulic arrangement shown in FIG. 4 and described below. The hydraulic system 70 also includes several valves illustratively embodied as electrically-controlled two-position solenoid valves. In other embodiments, the valves may be variable. In any event, the hydraulic system 70 includes a center valve 74, a right float pressure valve 76, a left float pressure valve, 78, a header raise valve 80, and a header lower valve 82. The center valve 74 is biased to remain open when not electrically activated, and the other valves 76, 78, 80, 82 are biased to remain closed when not electrically activated. The components of the hydraulic system 70 may be referred to as fluidly coupled to one another in a hydraulic circuit as shown in FIG. 4. Valves that are being electrically activated or powered may be referred to as "on" while valves that are not being electrically activated or powered may be referred to as "off."

As suggested by FIG. 4, when the center valve 74 is in the closed position (i.e. "on") and the right float pressure valve 76 is in the open position (i.e. "on"), the pressure in the float actuator 64 increases. In contrast, when the center valve 74 is in the open position (i.e. "off") and the right float pressure 76 is in the open position (i.e. "on"), the pressure in the float actuator 64 decreases. When the center valve 74 is in the closed position (i.e. "on") and the left float pressure valve 78 is in the open position ("on"), the pressure in the float actuator 66 increases. And in contrast, when the center valve 74 is in the open position (i.e. "off") and the right float pressure valve 78 is in the open position ("on"), the pressure in the float actuator 66 decreases. Increase and decrease of pressure in one float actuator (e.g., 64) may occur independently of that in the other float actuator (e.g., 66). In contrast, raising and lowering of the traction assembly 36 via pivoting motion of the rockshaft 40 occurs in response to extension or contraction of a single lift actuator 42. To raise the traction assembly 36 via the lift actuator 42, the center valve 74 must be in the closed position (i.e. "on") and the header raise valve 80 must be in the open position (i.e. "on") such that the lift actuator 42 contracts. To lower the traction assembly 36 via the lift actuator 42, the header lower valve 82 must be in the open position (i.e. "on") such that the lift actuator 42 extends. These principles of operation are used in connection with the methods described below to rapidly move the header 22 to the harvesting position, as described below.

Figure 5:
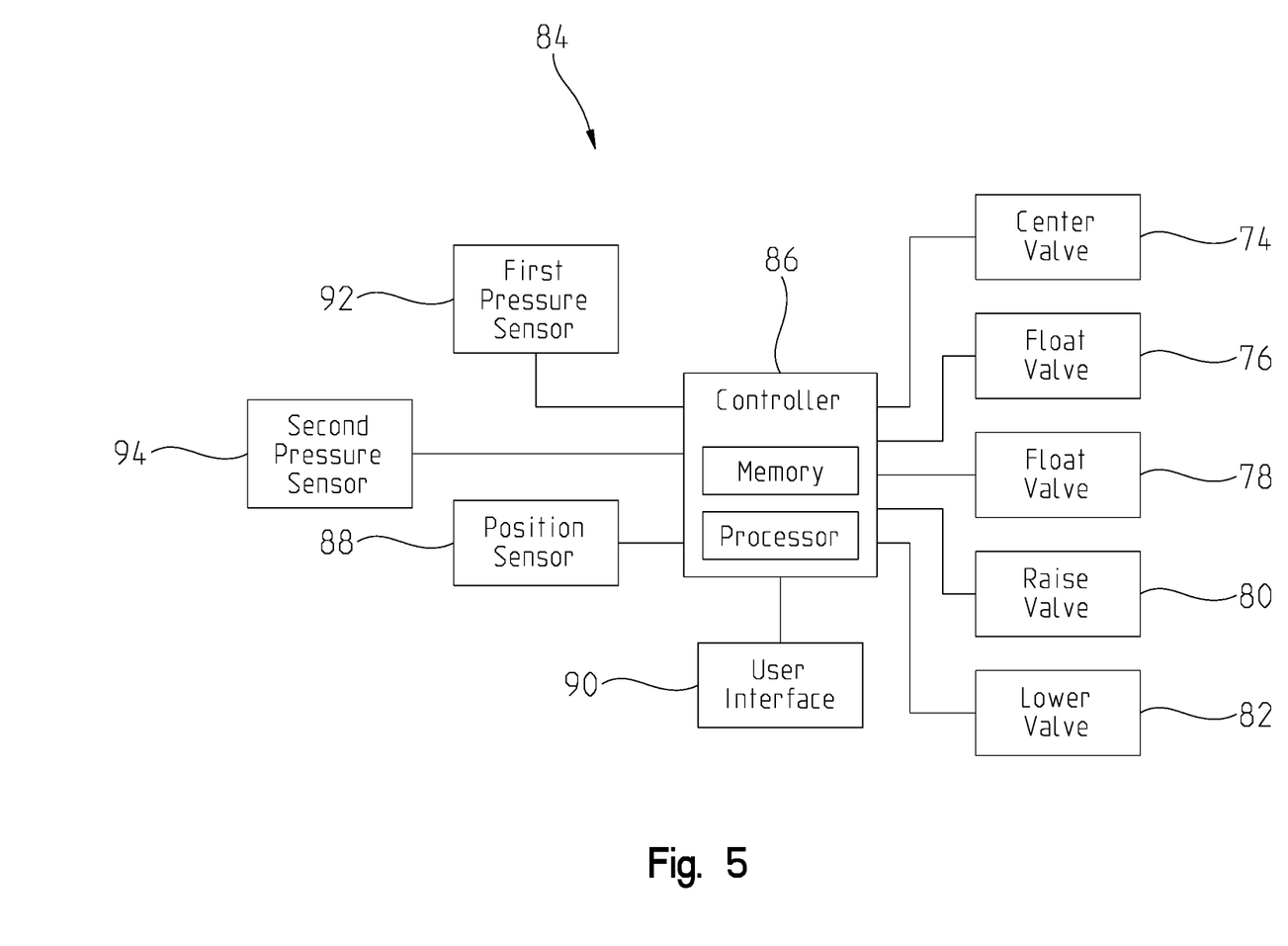
FIG. 5 is a diagrammatic view of a control system for the agricultural machine of FIGS. 1 and 2 having a controller, a height sensor, and a plurality of valves that are controlled by the controller.

Referring now to FIG. 5, a diagrammatic view of a control system 84 of the agricultural machine 10 is shown. The control system 84 includes a controller 86 having at least one memory and at least one processor configured to execute instructions (i.e., algorithmic steps; see FIGS. 6-8, for example) that are stored on the at least one memory. The controller 86 may be a single controller or a plurality of controllers operatively coupled to one another. The controller 86 may be housed by the agricultural machine 10 or positioned remotely, away from the agricultural machine 10. The controller 86 may be hardwired or connected wirelessly to other components of the agricultural machine 10 via Wi-Fi, Bluetooth, or other known means of wireless communication.

As suggested by FIG. 5, the controller 86 is operatively coupled to the plurality of electrically-controlled valves of the hydraulic system 70. The controller 86 is configured to send signals to the valves 74, 76, 78, 80, 82 causing the valves to move between open and closed positions. In the illustrative embodiment, the controller 86 is also operatively coupled to at least one lift arm sensor 88, which is illustrative positioned on a forward end of one or both lift arms 48, 50, as shown in FIG. 3. The at least one lift arm sensor 88 may also be referred to as a position sensor 88. In other embodiments, the position sensor 88 may be configured to measure angular position, such as the angle of the lift arms 48, 50 relative to a portion of the main frame 12.

In any event, the controller 86 is configured to receive signals from the at least one position sensor 88 indicative of the height of one or both lift arms 48, 50 relative to the ground, relative to the main frame 12, or relative to another component of the agricultural machine 10 having a known height. If a height of the main frame 12 relative to the ground is known, for example, a position of one or both lift arms 48, 50 relative to the main frame 12 may be used as a proxy for the height of one or both lift arms 48, 50 relative to the ground. Therefore, in the illustrative embodiment, the at least one position sensor 88 may be any sensor(s) suitable to measure position or rotation of the lift arms 48, 50 directly or indirectly relative to the ground or relative to another component of the agricultural machine 10.

In some embodiments, the controller 86 is operatively coupled to first and second pressure sensors 92, 94 that are configured to measure the pressure in the float actuators 64, 66, respectively. In other embodiments, the pressure sensors 92, 94 may be positioned in other locations of the hydraulic system 70 so long as the sensors are suitable to measure the in-line pressure of the hydraulic circuit corresponding to the pressure of the float actuators 64, 66. The pressure sensors 92, 94 are configured to send signals to the controller 86 indicative of the pressure in the float actuators 64, 66.

The controller 86 may be operatively coupled to a user interface 90 (e.g., the user interface positioned in the operator cab 18) and configured to receive input data from the user via the user interface 90. Moreover, the controller 86 may output data to the user interface 90 such as data indicating the height of the lift arms 48, 50 or the pressure of the float actuators 64, 66.

Figure 6:
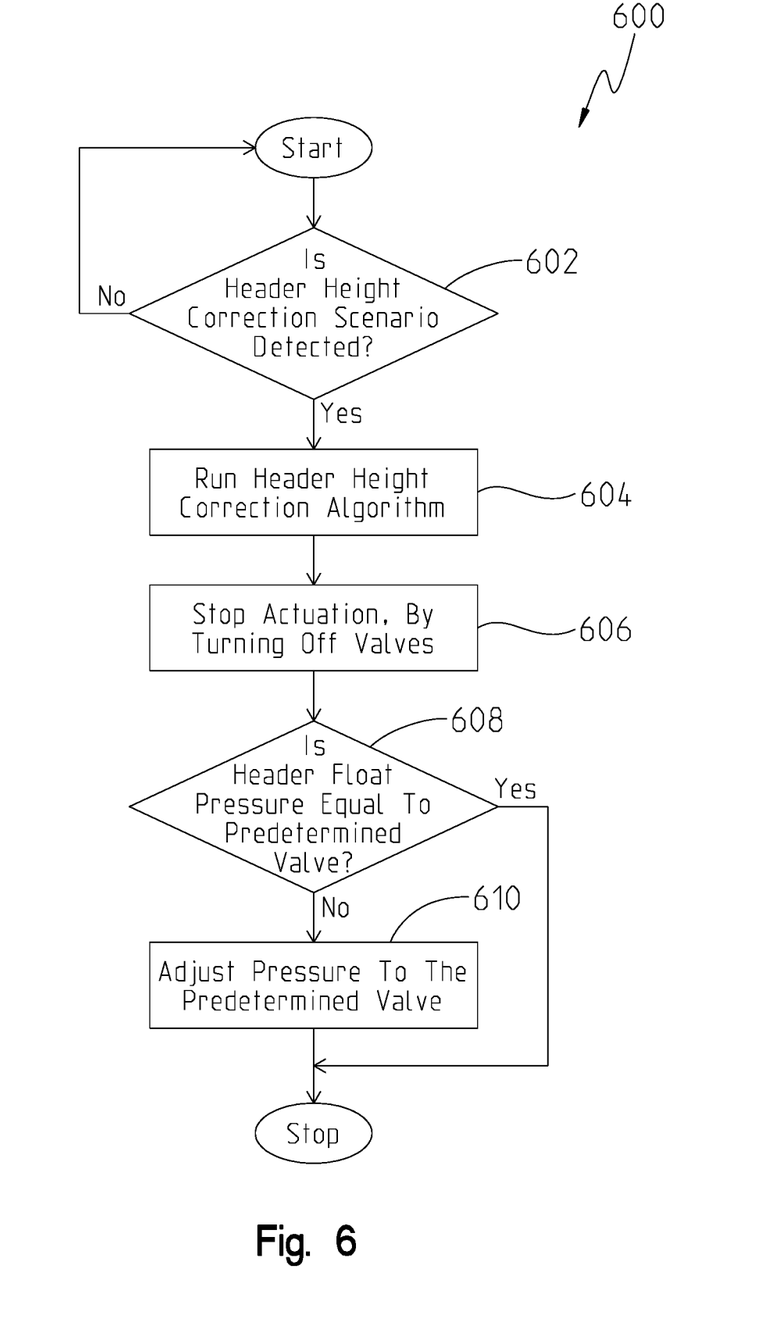
FIG. 6 is a flow chart showing a process of identifying and correcting header height for a header coupled to the traction assembly of FIG. 3, wherein the header is another name for the implements of FIGS. 1 and 2.

As shown in FIG. 6, a method 600 of correcting header height includes steps 602, 604, and 606. At step 602, the controller 86 determines that a height header correction scenario (i.e., a scenario prompting the need for rapid change in header height) has been detected. At step 604, the controller 86 executes a header height correction algorithm by sending signals to at least one of the electrically operated valves 72, 74, 76, 80, 82 to cause the valves to open or close; this may be referred to as turning "on" the valves. At step 606, the controller 86 stops sending electrical signals to the valves 72, 74, 76, 80, 82 which it was previously sending signals to in order to stop actuation of the lift actuator 42 and/or the float actuators 64, 66; this may be referred to as turning "off" the valves. At step 608 the controller 86 determines whether the pressure of a float actuator 64, 66 (e.g., as measured by pressure sensors 92, 94) is equal to a desired pressure value, which may be predetermined or set by an operator of the agricultural machine 10. If the measured pressure is not equal to the desired pressure value, then at a step 610 the controller 86 is configured to send signals to the valves 72, 74, 76, 80, 82 causing the valves to open or close to adjust the pressure to the desired pressure value.

Figure 7:
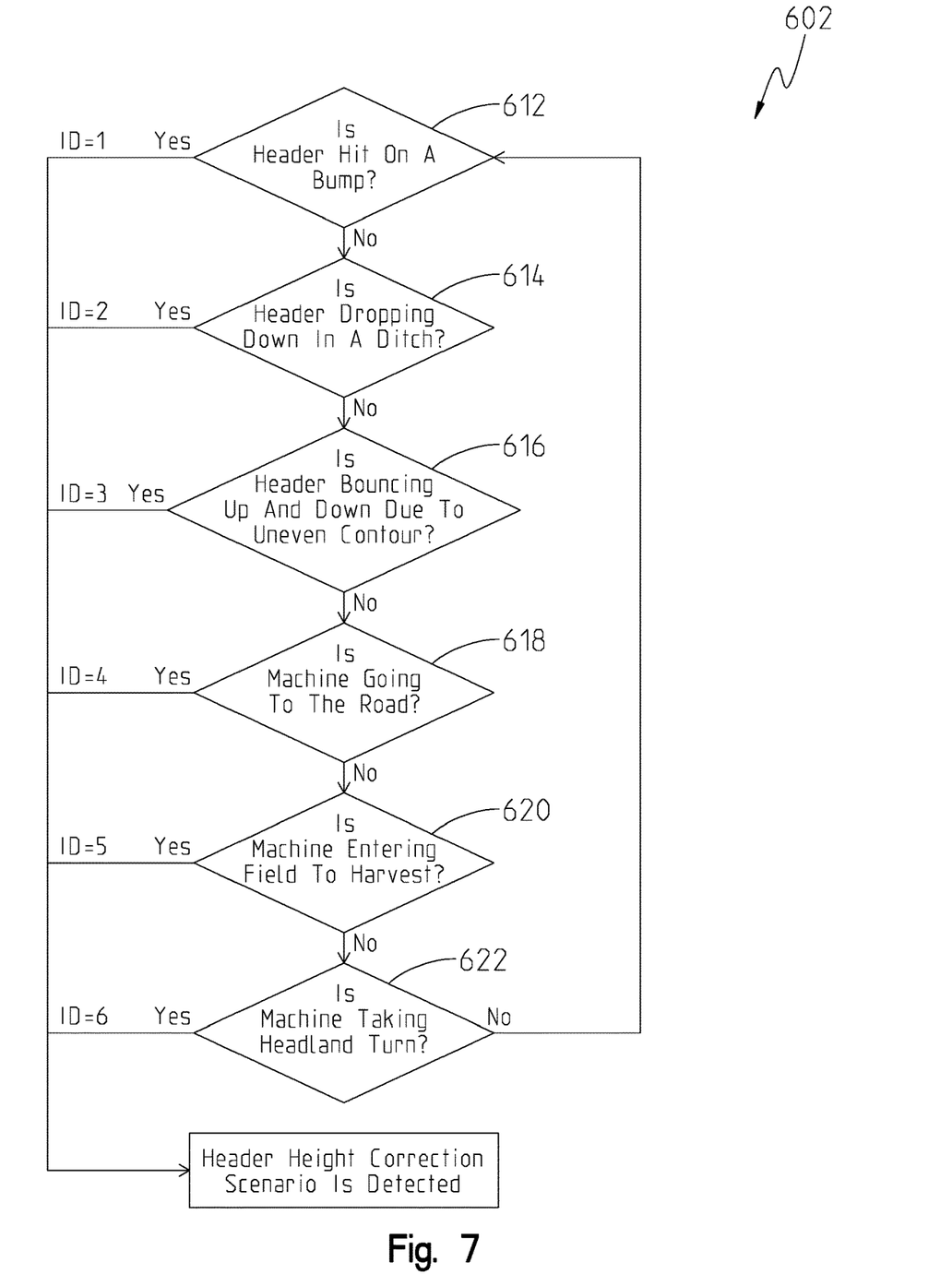
FIG. 7 is a flow chart showing in detail the process of detecting a header height correction scenario.
Figure 8A:
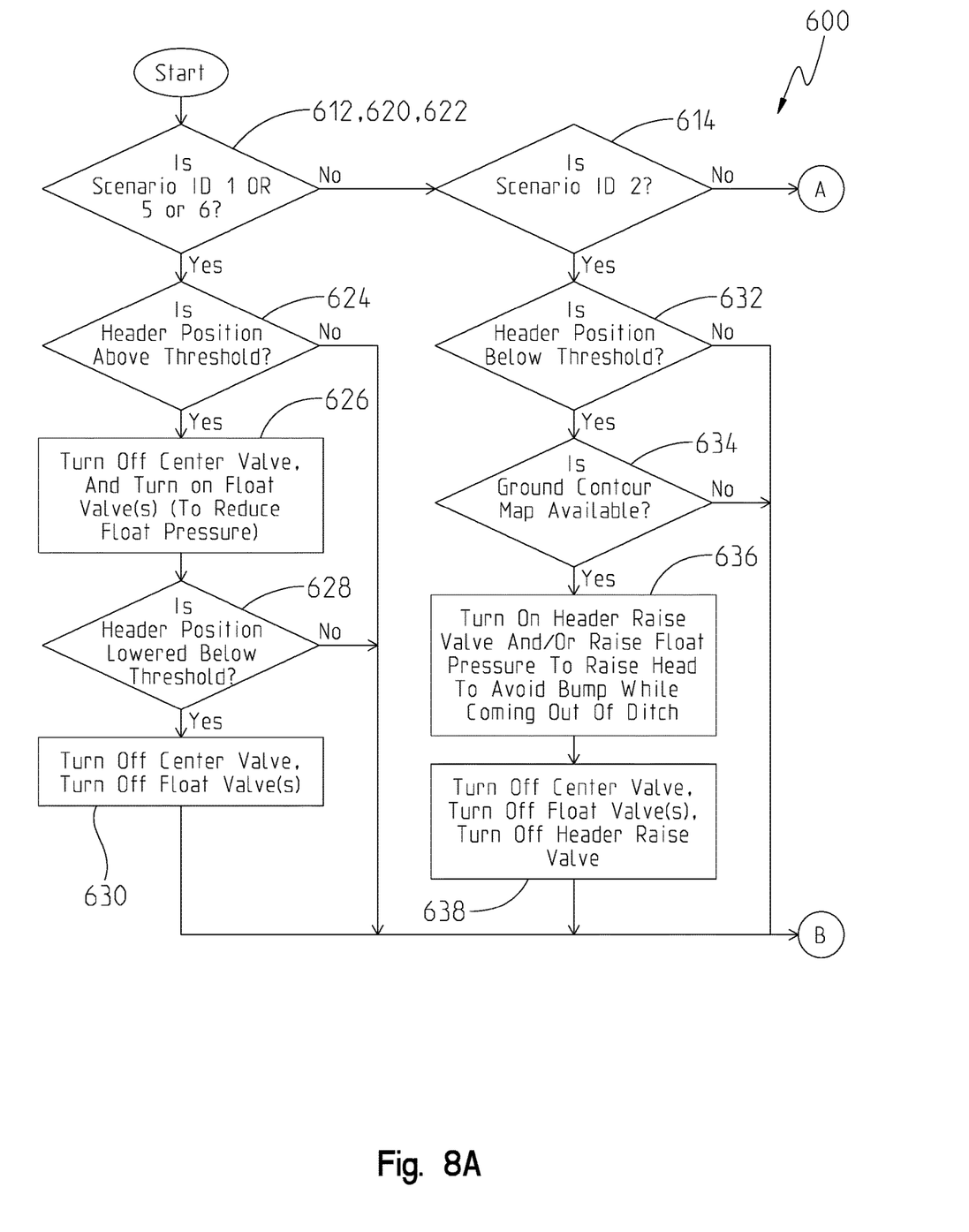
FIG. 8A is a flow chart showing in detail the process of detecting a header height correction scenario and correcting header height.
Figure 8B:
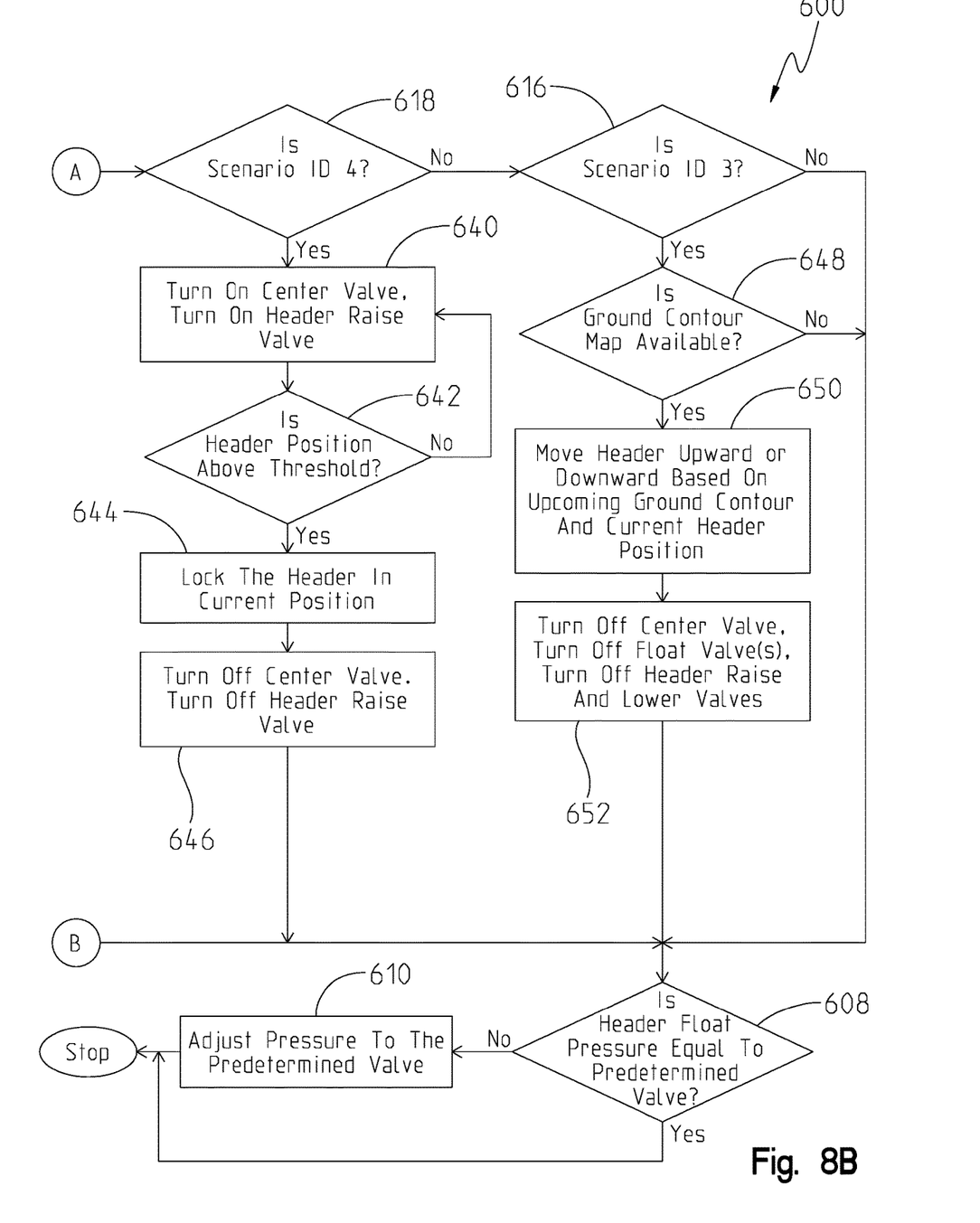
FIG. 8B is a flow chart showing a continuation of the process of detecting a header height correction scenario and correcting header height.

Referring now to FIG. 7, a more detailed disclosure of the process 602 of detecting a header height correction scenario is shown. It should be appreciated that steps of detecting a header height correction scenario may be performed in any order. Steps 612, 614, and 616 include determining whether the header 22 and/or lift arms 48, 50 have encountered uneven terrain urging the header 22 upward or downward. In the illustrative embodiment, the agricultural machine 10 is able to determine when the header 22 encounters uneven terrain such as a bump, a ditch, or repeatedly alternating uneven terrain. The determination is made by the controller 86 based on receipt and analysis of correction data, which includes at least one of (i) a current position of the header 22 relative to the ground or relative to the main frame 12 and (ii) a current pressure value representative of the pressure of a float actuator (i.e., 64 or 66). While FIG. 8, for example, describes the "position threshold," it should be appreciated that the valves and actuators described herein may also be adjusted by the controller 86 in response to measured pressure values received by the controller 86. For example, in some embodiments, pressure in the hydraulic system 70 is used as a proxy or value associated with the height of the header 22. In other embodiments, the position sensor 88 is used to measure the height of the header 22 independent of a pressure measurement.

In the illustrative embodiment shown in FIG. 8, the controller 86 compares the measured height of the header 22 to the harvesting position of the header 22, which is a desired height for the header during a harvesting operation. The controller 86 executes the rapid height correction algorithm if the measured height of the header 22, is above or below a threshold difference from the desired height. For example, at step 624, the controller 86 determines based on correction data received from the position sensor 88 whether the header 22 is above the position threshold. If so, then at a step 626, the controller 86 sends electrical signals to turn off the center valve 74 and turn on a float valve 76, 78 to reduce the pressure in the float valve 76, 78, which facilitates rapid movement of the header 22 to the harvesting position. At steps 628 and 630, if the controller 86 determines based on the position sensor 88 that the header 22 is in the harvesting position, (i.e. below a lower position threshold), then in response, the controller 86 turns off the center valve 74 (or ensures that the valve is off) and turns off the float valve 76, 78. In other embodiments, the controller 86 determines based on correction data received from the pressure sensors 92, 94 whether a decrease in pressure at a float actuator 64, 66 beyond a threshold pressure has occurred. If so, then the controller 86 sends electrical signals to turn off the center valve 74 and turn on a float valve 76, 78 to reduce the pressure in the float valve 76, 78, which facilitates rapid movement of the header 22 to the harvesting position. Thereafter, the controller 86 sends electrical signals to turn off the center valve 74 and the float valves 76, 78, as described above.

Referring still to FIG. 8, at step 632, the controller 86 determines based on correction data received from the position sensor 88 whether the header 22 is below the position threshold. If so, then at a step 634, the controller 86 determines whether terrain data is stored in the memory. If so, then the controller 86 determines whether the header 22 is passing through a ditch or advancing along a continuing downslope. If the header 22 is advancing along a continuous downslope then no action is taken; however, if the header 22 is below the position threshold because it has entered a ditch, then at step 636, the controller 86 sends electrical signals to turn on the center valve 74 and turn on the header raise valve 80 to lift the header 22 to avoid contact with the upward-sloping side of the ditch. At step 636, it is also contemplated that the controller 86 may send electrical signals to turn on the center valve 74 and turn on the float valves 76, 78 thereby raising the float pressure in the float actuators 64, 66 to raise the header 22. Thereafter, as shown at step 638, the controller 86 sends electrical signals to turn off the center valve 74, the float valves 76, 78, and the header raise valve 80.

Referring again to FIG. 7, the process 602 of detecting a header height correction scenario also include steps 618, 620, and 622, which include determining whether the agricultural machine 10 is moving from the field to the road (i.e. step 618), moving from the road to the field (i.e. step 620), or taking a headland turn (i.e. step 622), which may also be described as a 180 degree turn often occurring at the boundary of a field or the end of a planted portion thereof. In the illustrative embodiment, the agricultural machine 10 follows a known operating sequence indicative of each step 618, 620, 622 described above. For example, when the agricultural machine is making a headland turn, the header 22 is raised and the ground engaging mechanisms (e.g. wheels 14, 16) are turned; likewise when the agricultural machine 10 moves from the field to the road, the header 22 is raised; and likewise when the agricultural machine moves from the road to the field, the header 22 is lowered. The controller 96 compares the current operating sequence of the agricultural machine 10 to operating sequences stored in the memory to determine whether the agricultural machine 10 is moving from the field to the road (i.e. step 618), moving from the road to the field (i.e. step 620), or taking a headland turn (i.e. step 622). In some embodiments, based on global positioning (GPS) data provided to the controller 86, the controller 86 is determines whether the agricultural machine 10 is moving from the field to the road (i.e. step 618), moving from the road to the field (i.e. step 620), or taking a headland turn (i.e. step 622). In some embodiments, based on operator input to the user interface 90 received by the controller 86, the controller 86 determines whether the agricultural machine 10 is moving from the field to the road (i.e. step 618), moving from the road to the field (i.e. step 620), or taking a headland turn (i.e. step 622).

Referring again to FIG. 8, at step 640, in response to determining that the agricultural machine 10 is moving from the field to the road, the controller 86 sends electrical signals to turn on the center valve 74 and turn on the header raise valve 80 to raise the header 22. As shown at steps 642, 644, if the controller 86 determines that the header 22 is positioned above a predetermined or operator-input threshold height (e.g., based on measurements received from the sensors 88, 92, 94), the controller 86 may provide output to the user interface 90 instructing the operator to lock the header 22 in the current position or may, for example, send signals to an actuator (i.e. 42, 64, 66) of the traction assembly 36 causing movement thereof to automatically lock the header 22 in the current position. Thereafter, as shown at step 646, the controller 86 sends electrical signals to turn off the center valve 74 and the header raise valve 80.

Referring still to FIG. 8, at step 648, in response to determining that the header 22 is repeatedly moving upward and downward, the controller 86 consults the terrain data if such data is available. At step 650, the controller 86 sends electrical signals to center valve 74 and at least one of the valves 76, 78, 80, and 82 to move the header 22 upward and downward in response to the ground contours included in the terrain data and the determined position of the header 22 (e.g., based on measurements received from the sensors 88, 92, 94), as described above. Thereafter, as shown at step 652, the controller 86 sends electrical signals to turn off the center valve 74, the float valves 76, 78, the header raise valve 80, and the header lower valve 82.

As shown in FIG. 8, in each instance of a header height scenario being detected, and subsequent to a header height correction algorithm being executed, the controller 86 executes steps 608 and 610 to return the pressure in the header float valves 64, 66 to the desired pressure value, as described above.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural machine for rapidly moving a header to a harvesting position comprising:
   a main frame supported above the ground by ground engaging mechanisms;
   a lift arm pivotably coupled to the main frame;
   the header which is configured to harvest crop, wherein the header is coupled to and supported above the ground by the lift arm;
   a lift actuator configured to extend and contract to pivot the lift arm and the header relative to the main frame;
   a float actuator pivotably coupled to the lift arm and the main frame to support the header above the ground;
   at least one valve fluidly coupled to the float actuator and configured to move between open and closed positions to change pressure in the float actuator;
   a controller configured to send electrical signals to the at least one valve to execute a rapid height correction algorithm, in which the controller adjusts at least one of the float actuator and the lift actuator causing a change in height of the header relative to the ground, in response to receiving terrain data including ground contours and receiving correction data associated with at least one of a current height of the header and a current pressure of the float actuator.

2. The agricultural machine of claim 1, further comprising a position sensor operatively coupled to the controller and configured to measure a current height of the header relative to the main frame or relative to the ground;
   wherein the controller is configured to receive correction data from the position sensor associated with the current height of the header;
   wherein the controller is configured to compare the current height of the header to the harvesting position of the header, which is a predetermined desired height for the header during a harvesting operation; and
   wherein the controller is configured to execute the rapid height correction algorithm in response to determining that the current height of the header is beyond a threshold difference from the harvesting position of the header.

3. The agricultural machine of claim 2, wherein in response to determining that the current height of the header is above the harvesting position of the header, the controller sends electrical signals to the least one valve causing the float actuator to extend.

4. The agricultural machine of claim 1, further comprising a pressure sensor operatively coupled to the controller and configured to determine the current pressure of the float actuator;
   wherein the controller is configured to receive correction data from the pressure sensor indicative of the current pressure of the float actuator; and
   wherein the controller is configured to execute the rapid height correction algorithm in response to receiving the correction data from the pressure sensor.

5. The agricultural machine of claim 4, wherein if the correction data received from the pressure sensor is associated with a current height of the header above the harvesting position, then to execute the rapid height correction algorithm the controller sends electrical signals to the least one valve causing the float actuator to extend.

6. The agricultural machine of claim 5, wherein to cause the float actuator to extend, the controller is configured to send a first electrical signal to a first valve causing the first valve to move toward the open position and a second electrical signal to a second valve causing the second valve to move toward the open position.

7. The agricultural machine of claim 4, wherein the correction data includes a signal from the pressure sensor indicative of a decrease in current pressure in the float actuator; and
   wherein in response to the signal from the pressure sensor indicative of a decrease in current pressure in the float actuator, the controller is configured to send electrical signals to the least one valve causing a further decrease in the current pressure of the float actuator.

8. The agricultural machine of claim 4, wherein the correction data includes a signal from the pressure sensor indicative of an increase in the current pressure of the float actuator; and
   wherein in response to the signal from the pressure sensor indicative of an increase in the current pressure of the float actuator, the controller is configured to send electrical signals to the least one valve causing a further increase in the current pressure of the float actuator.

9. The agricultural machine of claim 8, wherein the controller is configured to analyze the terrain data including ground contours to determine whether to send electrical signals to the least one valve causing a further increase in the current pressure of the float actuator.

10. The agricultural machine of claim 4, wherein if the correction data received from the pressure sensor is associated with a current height of the header below the harvesting position, then to execute the rapid height correction algorithm the controller sends electrical signals to the at least one valve causing the lift actuator to contract.

11. The agricultural machine of claim 4, wherein if the correction data received from the pressure sensor is associated with a current height of the header below the harvesting position, then to execute the rapid height correction algorithm the controller sends electrical signals to the at least one valve causing the float actuator to contract.

12. The agricultural machine of claim 1, wherein subsequent to execution of the rapid height correction algorithm, the controller is configured to compare a predetermined pressure of the float actuator to the current pressure of the float actuator; and
   wherein the controller is configured to send additional signals to the at least one valve to adjust the current pressure of the float actuator to match the predetermined pressure of the float actuator.

13. The agricultural machine of claim 1, wherein the correction data comprises global positioning data associated with the agricultural machine performing a 180 degree turn and moving between a field and a road.

14. The agricultural machine of claim 1, wherein the correction data comprises a predetermined operating sequence of the agricultural machine associated with at least one of the agricultural machine performing a 180 degree turn and the agricultural machine moving between a field and a road.

15. An agricultural machine for rapidly moving a header to a harvesting position comprising:
   a main frame supported above the ground by ground engaging mechanisms;
   a rockshaft pivotably coupled to the main frame for rotation about a first axis;
   a lift actuator coupled at a first end to the main frame and at a second end to the rockshaft to facilitate pivoting motion of the rockshaft relative to the main frame;
   a lift arm pivotably coupled to the main frame for rotation about a second axis parallel to the first axis;
   a header configured to harvest crop, the header being coupled to and supported above the ground by the lift arm;
   a float actuator pivotably coupled to the lift arm for rotation about a third axis, the third axis being parallel to the first axis, wherein the float actuator provides an upward force to the lift arm, thereby cooperating with the lift arm to support the header above the ground;
   at least one valve fluidly coupled to the float actuator and configured to move between open and closed positions to change the pressure in the float actuator; and
   a controller configured to send electrical signals to the at least one valve to execute a rapid height correction algorithm, which extends or contracts the float actuator causing a change in height of the header relative to the ground, in response to receiving terrain data including ground contours and receiving correction data associated with at least one of a current height of the header and a current pressure of the float actuator;
   wherein contraction of the float actuator is configured to occur independent of pivoting motion of the rockshaft relative to the main frame.

16. A method of operating an agricultural machine to rapidly return a header of the agricultural machine to a harvesting position, the method comprising:
   receiving, from a sensor of the agricultural machine, correction data associated with a current position of the header;
   comparing the correction data with terrain data including ground contours and the harvesting position of the header, which is a predetermined value associated with a desired height of the header during a harvesting operation;
   adjusting a float actuator that supports the header above the ground, to move the header to the harvesting position, in response to the determining a difference between the correction data and the harvesting position, wherein the float actuator is coupled between a lift arm that assists in supporting the header above the ground and a main frame of the agricultural machine to which the lift arm is pivotably coupled.

17. The method of claim 16, further comprising:
   prior to the receiving step, measuring a current pressure of the float actuator via the sensor to obtain the correction data.

18. The method of claim 16, further comprising:
   prior to the receiving step, measuring the height of the header relative to the ground via the sensor to obtain the correction data.

19. The method of claim 16, further comprising:
   prior to the receiving step, measuring the height of the header relative to the main frame of the agricultural machine via the sensor to obtain the correction data.

20. The method of claim 16, wherein the adjusting step includes:
   sending electrical signals to a first valve and a second valve, which are fluidly coupled to the float actuator to cause movement of the first valve and the second valve between open and closed positions.

* * * * *